United States Patent [19]

Reichard

[11] 3,926,448
[45] Dec. 16, 1975

[54] GOLF CART PULLING APPARATUS
[76] Inventor: Kenneth Reichard, 2601 NW. 23rd Blvd., Apt. 131, Gainesville, Fla. 32605
[22] Filed: May 30, 1974
[21] Appl. No.: 474,798

[52] U.S. Cl. .................. 280/1.5; 280/36 R; 280/62; 280/DIG. 6
[51] Int. Cl.² ........................................ B62D 51/04
[58] Field of Search ...... 280/62, DIG. 6, 1.5, 47.34, 280/36 R

[56] References Cited
UNITED STATES PATENTS

| | | | |
|---|---|---|---|
| 469,507 | 2/1892 | Spencer | 280/62 |
| 897,853 | 9/1908 | Scheidt | 280/62 X |
| 2,559,981 | 7/1951 | McBride | 280/1.5 UX |
| 3,305,244 | 2/1967 | Flagg | 280/62 X |
| 3,328,043 | 6/1967 | Johnson | 280/1.5 |

FOREIGN PATENTS OR APPLICATIONS

| 483,754 | 4/1938 | United Kingdom | 280/47.34 |
|---|---|---|---|

*Primary Examiner*—Leo Friaglia
*Assistant Examiner*—Michael J. Forman
*Attorney, Agent, or Firm*—Woodard, Weikart, Emhardt & Naughton

[57] ABSTRACT

A three-wheeled pullable golf cart. Two wheels are rotatably mounted to the front end of a main frame whereas the third wheel is rotatably and pivotally mounted to the opposite end of the main frame. A telescopic rod is pivotally mounted to the front end of the main frame and has an adjustable belt arrangement adapted to secure the rod to the hips of a person pulling the cart. Means are provided for holding a golf bag on the main frame of the cart with the means being collapsible when not in use to facilitate storage of the cart. Additional means are provided to allow for the adjustment of the angle included between the horizontal and the telescopic rod.

5 Claims, 3 Drawing Figures

GOLF CART PULLING APPARATUS

BACKGROUND OF THE INVENTION

1. Field of the Invention

This invention is in the field of golf carts.

2. Description of the Prior Art

Many different types of golf carts have been devised to reduce the amount of energy expended by the golfer in transporting a golf club bag around the golf course. Some of the prior art golf carts are motorized and are relatively expensive as compared to the golf cart pulled or pushed by the golfer. Likewise, many of the prior art golf carts that are pulled or pushed are collapsible to effect storage of the carts in an area such as the trunk of an automobile. The golf cart disclosed herein is easily pulled by the golfer and, in addition, may be easily collapsed and stored in a storage space such as a trunk of an automobile. The cart fastens around the hips of the golfer thereby not requiring the golfer to use his hands for pulling the cart. Since the golfer has free use of both hands during lateral pull, the golfer may mark the scorecard, hold an umbrella, smoke or other various activities. Likewise, the golfer may keep his hands dry and warm by keeping his hands in the pockets of a jacket during inclement weather. The arrangement enables the golfer to walk in a normal manner, swinging his arms freely while strengthening the hip and leg muscles. The subject golf cart includes an oscillating rear wheel which causes the cart to oscillate slightly thereby massaging the hips during lateral pull. The three-wheeled cart adequately supports the weight of the cart and the clubs and provides for relatively easy movement of the cart over the terrain.

SUMMARY OF THE INVENTION

One embodiment of the present invention is a golf cart comprising a main frame, at least three wheels rotatably mounted to the main frame, a golf bag holding means movably mounted on the frame being erectable when in use and collapsible when not in use and connecting means secured to said main frame and adapted to be attached to the hips of a human for pulling the golf cart.

It is an object of the present invention to provide a new and improved golf cart.

A further object of the present invention is to provide a golf cart which is connectable to the hips of the golfer enabling the golfer to pull the cart without using his hands.

Related objects and advantages of the present invention will be apparent from the following description.

DESCRIPTION OF THE PREFERRED EMBODIMENT

Figure 1:
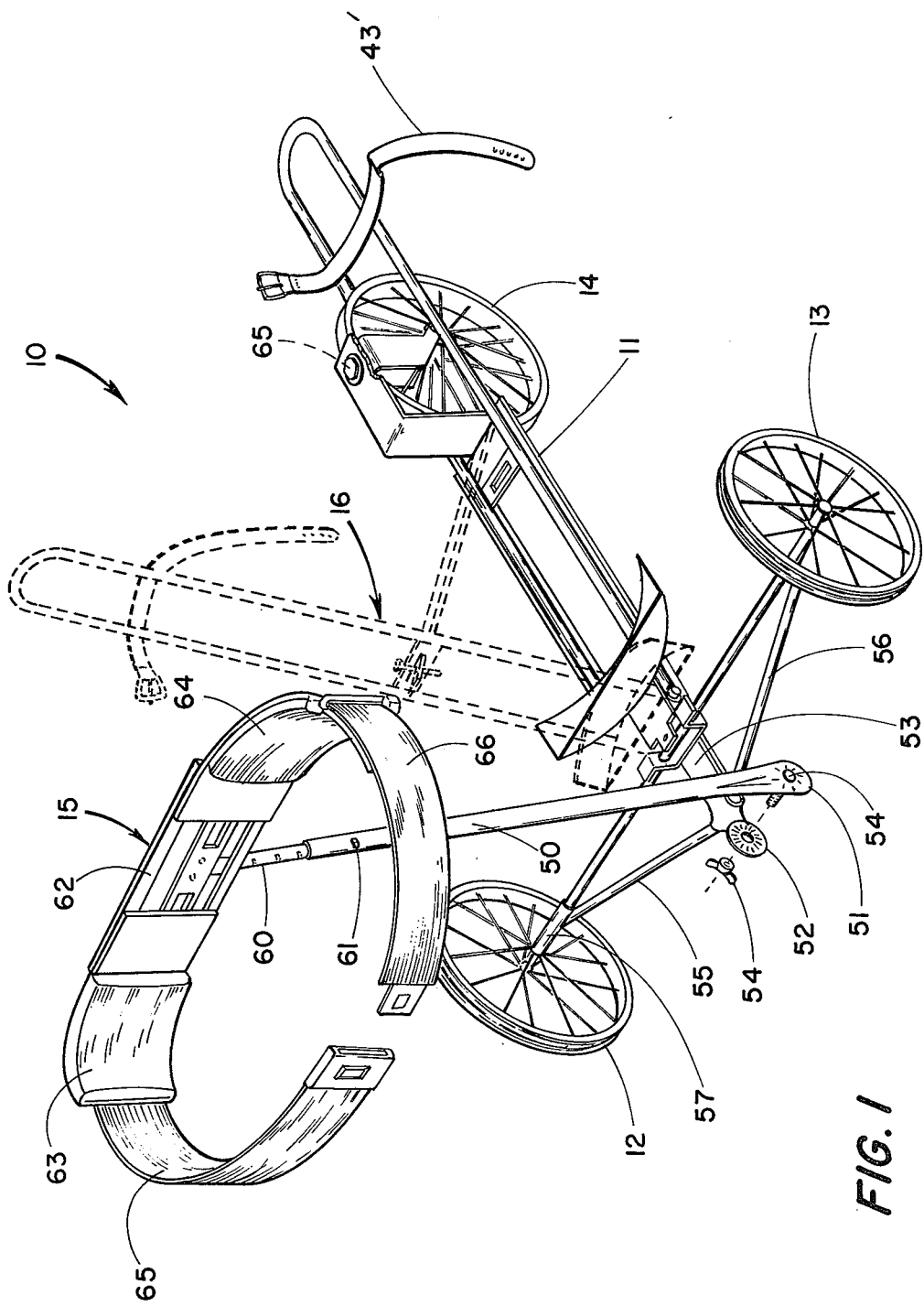
FIG. 1 is a perspective view of a golf cart incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a golf cart 10 having a main frame 11 with a pair of front wheels 12 and 13 and a rear wheel 14 rotatably mounted thereto. Connecting means 15 is secured to main frame 11 and is adapted to be attached to the hips of the golfer for pulling the golf cart. Holding means 16 is movably mounted to frame 11 and is erectable to the dash line position during use and collapsible in the solid line position when not in use. Means 16 is utilized to hold a golf club bag.

Main frame 11 (FIG. 2) includes an elongated channel with a bottom wall 17 integrally joined by vertical walls 18 and 19 to a pair of horizontally extending shelves 20 and 21. Front axle 22 is mounted to and extends through walls 18 and 19 with wheels 12 and 13 rotatably mounted to the opposite ends of the axle. An upwardly and rearwardly extending bracket 23 is integrally attached to bottom wall 17 at the end of the channel opposite the end attached to axle 22. Wheel 14 is rotatably mounted by axle 24 to a pair of downwardly extending arms 25 and 26 pivotally mounted by fastener 27 to the horizontally extending portion of bracket 23. As a result, wheel 14 may pivot around a vertical axis extending through fastener 27.

Figure 3:
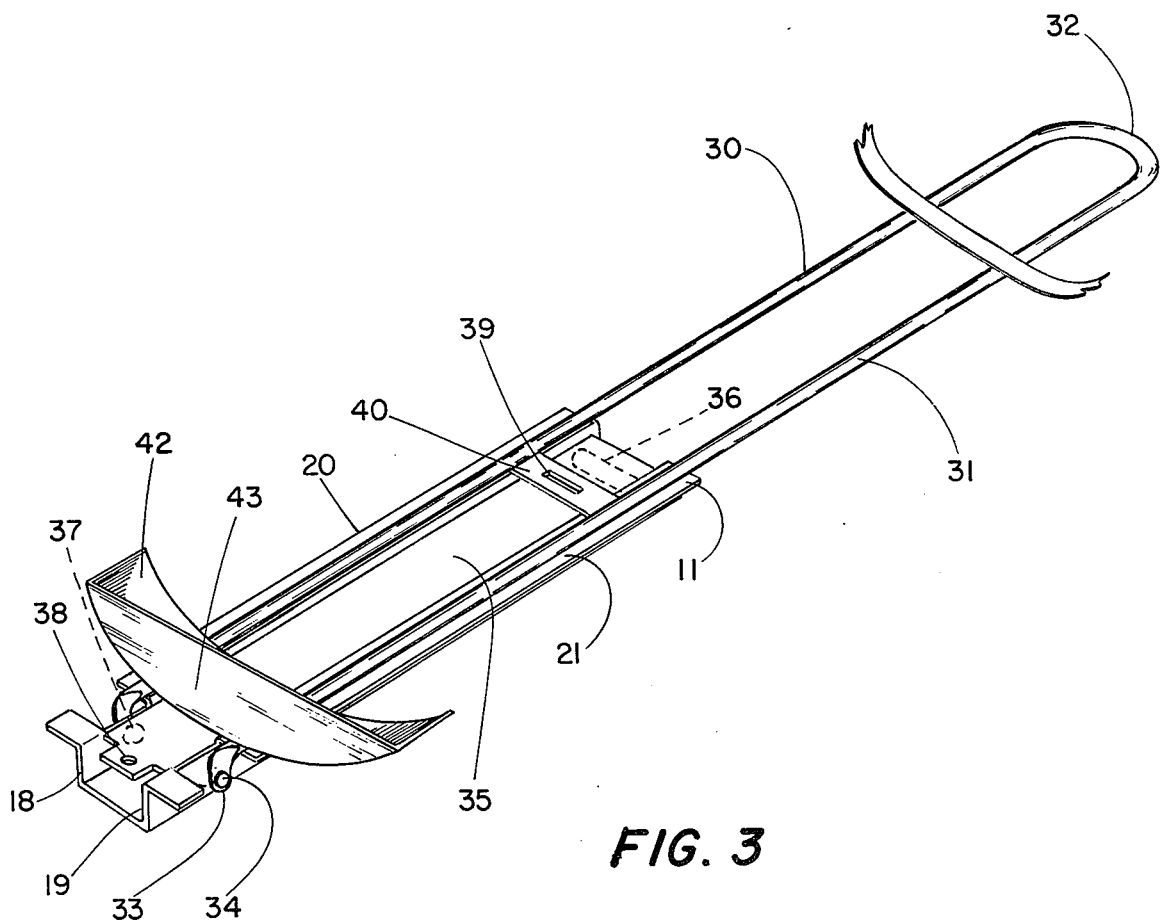
FIG. 3 is a perspective view of the frame shown in FIG. 2 only with the front and rear wheels removed from the main frame.

A portion of horizontally extending shelves 20 and 21 is removed adjacent axle 22 forming a pair of gaps 28 and 29. The means utilized to hold the golf bag includes a pair of rods 30 (FIG. 3) and 31 integrally attached at end 32 with the opposite ends of the rods being spaced apart and each having an offset portion pivotally mounted in gaps 28 and 29 to vertically extending walls 18 and 19. For example, end 33 of rod 31 is pivotally attached by fastener 34 to wall 19. Whereas rod 30 is pivotally attached by fastener 37. Walls 18 and 19 are positioned between rods 30 and 31. The rods extend rearwardly from gaps 28 and 29 resting atop shelves 20 and 21 when the rods are not erected.

A supporting wall 35 is pivotally mounted by fastener 36 to walls 18 and 19 (FIG. 3) immediately adjacent the end of frame 11 which attaches to bracket 23. End 38 of wall 35 may be pivoted upward after rods 30 and 31 are pivoted upward. End 38 is configured as a tab and is sized to fit into slot 39 of wall 40 connected to and between rods 30 and 31. End 38 is provided with an aperture for receiving an elongated member such as a golf tee after the tab has been inserted into slot 39 for securing the rods in the upward position as shown in the dash line position of FIG. 1. When not in use, wall 35 pivots downwardly resting atop wall 17 with rods 30 and 31 then being pivoted downward and over wall 35 and with bracket 23 projecting between rods 30 and 31. An arcuate shaped wall 42 is fixedly mounted to rods 30 and 31 having a second wall 43 perpendicularly joined thereto. Walls 42 and 43 provide a base upon which the golf bag may rest. A strap 43' is mounted to the top ends of the rods for securing the top end of the golf bag to the rods.

Connecting means 15 includes a telescopic rod 50 having a bottom serrated end 51 mounted to a serrated disc 52 fixedly attached to member 53 in turn fixedly attached to frame 11. Fasteners 54 secure end 51 to disc 52. A pair of supports 55 and 56 are attached to member 53 with a pair of sleeves 57 attached to the opposite ends of supports 55 and 56 for rotatably receiving and supporting the front axle. Telescopic rod 50 includes a top rod 60 slidably mounted therein and secured thereto by a conventional fastener 61 extendable through apertures provided in rod 60. The top end of rod 60 is fixedly attached to frame 62 having a pair of arcuate shaped members 63 and 64 mounted thereto which are slidably adjustable to fit the curvature of the golfer's hips. A pair of belts 65 and 66 are respectively mounted to members 63 and 64 with a belt buckle arrangement being provided at the free ends of belts 65 and 66 for fastening and unfastening the belts.

Figure 2:
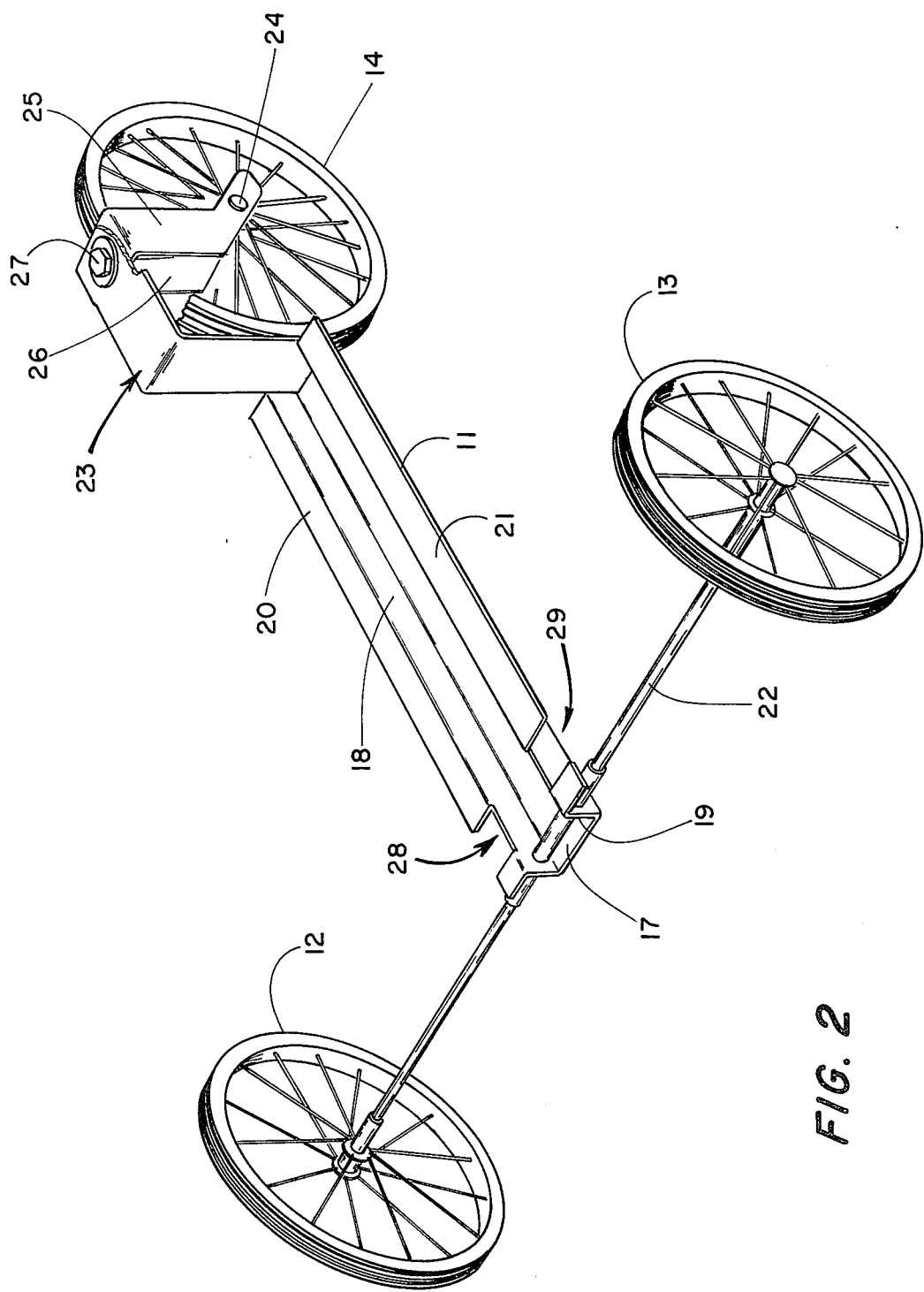
FIG. 2 is a perspective view of the main frame of the cart of FIG. 1.

Wheel 14 is rotatable about a horizontal axis perpendicular to a vertical pivot axis extending centrally through the head 65 (FIG. 1) of fastening device 27 (FIG. 2). Many variations are contemplated and included in the present invention. For example, the size and width of the cart may be varied as well as the size of the wheels. In one embodiment, the front wheels each had a diameter of 10 inches whereas the oscillating rear wheel had a diameter of 8 inches. In the same embodiment, the adjustable belts 65 and 66 each had a width of 3 inches with the telescopic rod 50 being adjustable so as to vary the angle between the rod and horizontal. The belt-telescopic rod arrangement is best described by the term "hip-snugger" since the belt surrounds the hips of the golfer pulling the cart. The golf cart may be described as a "tag-a-long" golf cart since the cart follows or tags the golfer. It will be obvious from the above description that the present invention provides a golf cart that permits the golfer free use of both hands in transit thereby enabling the golfer to walk in a normal manner, swing his arms freely and providing the golfer with equipment that will tend to strengthen hips, leg muscles and reduce the waistline. It is anticipated that the golf cart will be produced from a lightweight aluminum material.

It will be further obvious from the above description that the present invention includes a golf cart whereby the ground completely supports the weight of the cart and clubs. The telescopic rod may be disassembled from the golf cart for storage purposes. Various markings may be provided on the bottom end 51 of the telescopic rod and disc 52 so as to allow for alignment of the markings to automatically correctly position the telescopic rod with respect to the golfer. A variety of means may be utilized to secure the arcuate members 63 and 64. For example, members 63 and 64 may be secured to frame 62 by flathead machine screws which extend through frame 62 and members 63 and 64 being threadedly received by wing nuts and with serrated washers provided to prevent relative motion between members 63 and 64 with respect to frame 62. It is understood that members 63 and 64 are slidably mounted to frame 62 to allow for adjustment of the spacing between members 63 and 64.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A golf cart comprising:

a main frame with a front end and a back end;

at least three wheels rotatably mounted to said main frame, two of said three wheels rotatably mounted to said front end and another of said three wheels pivotally mounted to said back end;

a golf bag holding means movably mounted on said frame being erectable when in use and collapsible when not in use; and, connecting means secured to said main frame and adapted to be attached to the hips of a human for pulling the golf cart;

said holding means includes an elongated frame having a bottom end pivotally mounted to said main frame adjacent said front end;

said holding means further includes a support frame with a bottom end pivotally mounted to said main frame, said support frame has an upper end and is pivotable upward toward said elongated frame with said upper end of said support frame lockingly engageable with said elongated frame, said main frame includes a channel with at least two of said wheels mounted thereto, said channel includes a pair of opposed vertical walls joined together with said bottom end of said elongated frame pivotally mounted to said opposed vertical walls.

2. A golf cart comprising:

a main frame with a front end and a back end;

at least three wheels rotatably mounted to said main frame, two of said three wheels rotatably mounted to said front end and another of said three wheels pivotally mounted to said back end;

a golf bag holding means movably mounted on said frame being erectable when in use and collapsible when not in use; and, connecting means secured to said main frame and adapted to be attached to the hips of a human for pulling the golf cart;

said main frame has a front end with two of said wheels mounted thereto and a back end with another of said wheels pivotally mounted thereto;

said connecting means includes a rigid telescopic rod with a lower end pivotally mounted to said front end of said main frame, said connecting means further includes an adjustable belt arrangement mounted to said telescopic rod with said belt arrangement adapted to surround the hips of a person pulling the golf cart;

said holding means includes an elongated frame having a bottom end pivotally mounted to said main frame adjacent said front end;

said holding means further includes a support frame with a bottom end pivotally mounted to said main frame, said support frame has an upper end and is pivotable upward toward said elongated frame with said upper end of said support frame lockingly engageable with said elongated frame;

said main frame includes an elongated channel with opposite ends and an axle extending through said one of said opposite ends and an upwardly and rearwardly extending bracket mounted to the other opposite end, said axle has two of said three wheels mounted thereon and said bracket has the other of said three wheels pivotally mounted thereon;

said channel has a horizontally extending wall and a pair of elevated, aligned shelves extending along opposite sides of said wall, said support frame is pivotable downward when not in use and restable atop said wall, said elongated frame is pivotable downward when not in use and is restable atop said shelf with said bracket projecting upwardly through said elongated frame.

3. The golf cart of claim 2 wherein:

said telescopic rod includes fastening means operable to adjust the angle between horizontal and said rod.

4. A golf cart comprising:

a horizontally extending channel including a forward end and a rear end;

an axle having opposite ends and being mounted to and extending through said forward end;

a pair of wheels rotatably mounted to opposite ends of said axle;

a third wheel pivotally and rotatably mounted to said rear end of said channel;

a telescopic rod mounted to said forward end of said channel and extending upwardly therefrom providing means for pulling the golf cart;

a golf bag holding frame having a bottom end pivotally mounted to said forward end of said channel, said frame being pivotable from an erected position to a collapsed position atop said channel;

a second frame having a bottom end pivotally mounted to said rear end of said channel and further having a top end lockingly engageable with said golf bag holding frame when in said erected position, said second frame being pivotable downwardly against and between said channel and said golf bag holding frame;

a waist encircling belt arrangement mounted atop said telescopic rod;

said golf bag holding frame is an inverted U-shaped frame with offset bottom ends pivotally mounted to said channel;

said channel includes a pair of opposed vertical walls integrally joined together with said offset bottom ends pivotally mounted outwardly of said pair of vertical walls.

5. The golf cart of claim 4 wherein:

said channel has a pair of elevated, aligned, shelves joined to said opposed vertical walls, said support frame is pivotable downward when not in use and restable atop said shelves.

\* \* \* \* \*